March 17, 1970  W. L. ROEVER  3,500,950
RADIATION METHOD AND APPARATUS FOR MAPPING THE SURFACE
CHARACTERISTICS OF AN OBJECT
Filed March 12, 1969  3 Sheets-Sheet 1
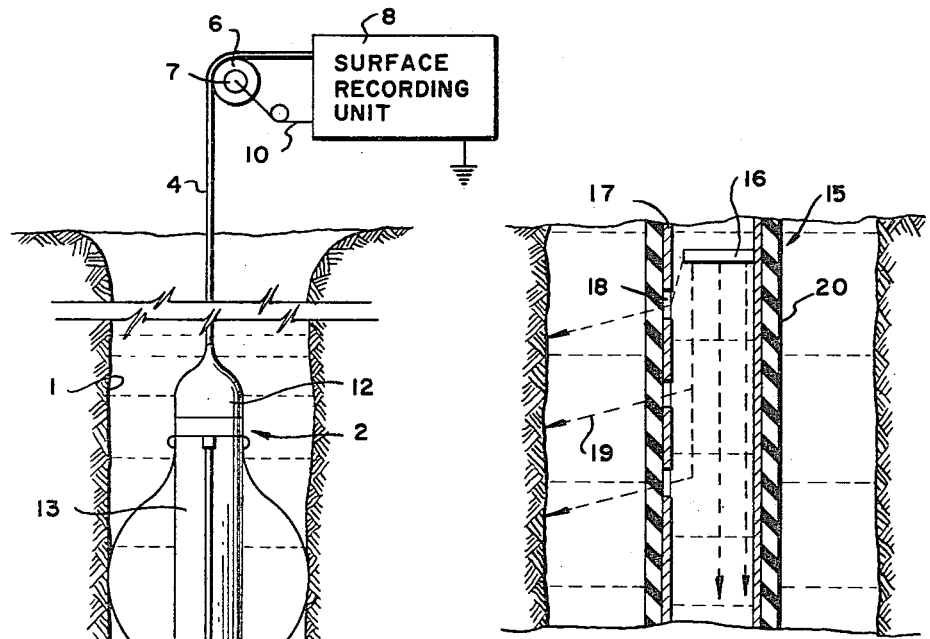
FIG. 2
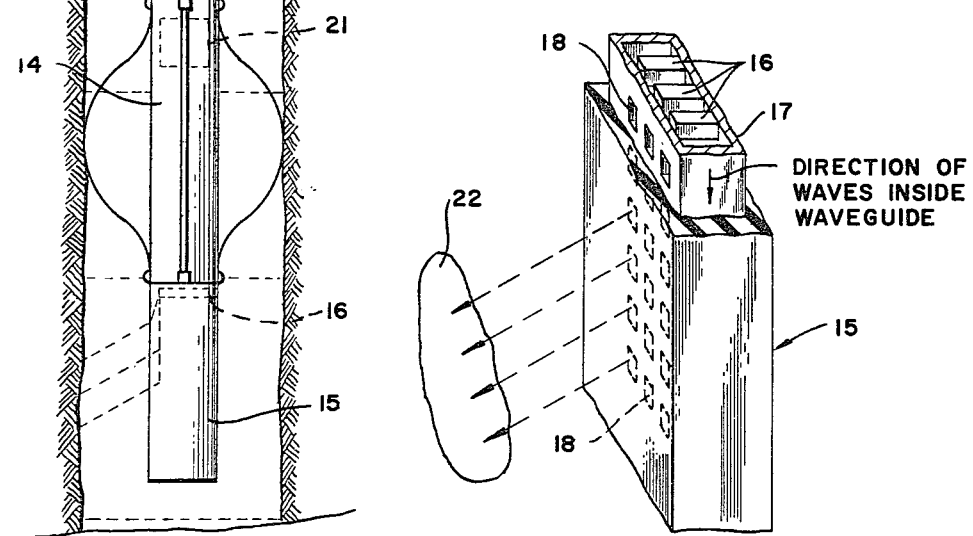
FIG. 1
FIG. 3
INVENTOR:
WILLIAM L. ROEVER
BY: *Louis J. Bovasse*
HIS ATTORNEY INVENTOR:
WILLIAM L. ROEVER
BY: *Louis J Bovasso*
HIS ATTORNEY March 17, 1970 W. L. ROEVER 3,500,950
RADIATION METHOD AND APPARATUS FOR MAPPING THE SURFACE
CHARACTERISTICS OF AN OBJECT
Filed March 12, 1969 3 Sheets-Sheet 3

INVENTOR:
WILLIAM L. ROEVER
BY: *Louis J Bovasso*

HIS ATTORNEY

United States Patent Office 3,500,950
Patented Mar. 17, 1970

3,500,950
RADIATION METHOD AND APPARATUS FOR MAPPING THE SURFACE CHARACTERISTICS OF AN OBJECT
William L. Roever, Houston, Tex., assignor to Shell Oil Company, New York, N.Y., a corporation of Delaware
Filed Mar. 12, 1969, Ser. No. 806,635
Int. Cl. G01v 1/40
U.S. Cl. 181—.5
14 Claims

ABSTRACT OF THE DISCLOSURE

A method and apparatus for scanning the surface of an object adjacent to a fluid by transmitting a pulsed beam of energy through the fluid and into engagement with the surface. A pulsed beam of radiation is transmitted from a predetermined position with respect to the object and guided through a radiation waveguide wherein the phase velocity of the beam is greater through the waveguide than in the surrounding medium. The pulsed beam is directed from the waveguide through the surrounding medium at a known angle and into engagement with the surface of the object. Radiation reflected from the surface is detected through the waveguide at substantially the predetermined position and known angle. The radiation reflected from any irregularities a substantially constant distance from the waveguide appearing along the surface is detected and recorded.

BACKGROUND OF THE INVENTION

Field of the invention

This invention relates to a radiation apparatus and method for mapping the surface of an object; and, more particularly, to a radiation apparatus and method that will accurately map the entire inner or outer surface of an object, such as a cylindrical opening or bore by scanning the surface with a beam of radiation such as an acoustic beam or electromagnetic beam.

Description of the prior art

Many procedures have been developed in the past to map the surfaces of objects. For example, techniques have been developed for mapping the inner wall of a borehole that penetrates various earth formations. Normally these procedures have utilized various photographic means for photographing the inner wall of a borehole and transmitting the picture image to the surface. Also, various systems have been developed that use deformable materials for obtaining an impression of the inner wall of a borehole. In addition, to the above methods that attempt to obtain a pictorial representation of the physical characteristics of the borehole, systems using various physical stresses, as for example, acoustical energy, resistivity and conductivity, have been used to log a borehole to obtain responses that indicate the characteristics of various formations penetrated by the borehole.

Of the above methods, those that obtain a pictorial representation of the borehole wall have several limitations. For example, those that attempt to use light to photograph the borehole wall or scan the borehole wall with a television camera are limited to boreholes containing an optically transparent liquid. This limitation means that such systems are limited almost exclusively to boreholes that are drilled as water wells or are capable of being filled with water. Thus, such systems are of little use in surveying boreholes that are normally drilled as petroleum producing wells. Petroleum wells are normally drilled using a drilling mud that is weighted with various materials to prevent an inflow of fluid from fluid-containing formations. While in some isolated cases it is possible to replace the drilling mud with water and still control the well, such cases are extremely rare.

Systems that depend upon the use of a deformable material to take a physical impression of the formation surface are limited due to the inability to survey any great length of borehole.

Systems that use various logging techniques such as acoustical or resistivity techniques for mapping a borehole wall have in the past provided only sketchy and inaccurate presentations of the formations. For example, one systems utilizes a relatively small number of sensing elements and then plots the response of each element separately, thereby providing only a limited amount of information concerning the characteristics of the borehole wall.

Thus, some prior art systems require coring while drilling, which is expensive and can only be done while drilling. Remote television cameras require a clear, transparent medium in the well and are generally too temperature-sensitive for general use. Such methods are inadequate for full condition evaluation.

One suggested method is disclosed in application Ser. No. 724,182, filed Apr. 25, 1968, to Adair. In the method disclosed in the above-identified application, pulsed beams are attenuated in traveling through a borehole fluid. The acoustic transducer must be rotated within the borehole, thus resulting in the necessity for utilizing moving parts which must function under high stresses. In my copending application Ser. No. 723,789, filed Apr. 24, 1968, I disclosed a method for mapping the wall of a borehole by transmitting and guiding the pulsed beams and detecting the reflected ultrasonic radiation through acoustic waveguides wherein the velocity is greater and the attenuation is less than in the borehole fluid. In both the Adair application and my copending application, the techniques disclosed therein could be used to map the surface of any object disposed adjacent to the described radiating waveguide. However, such techniques may not be readily adapted to mapping the surfaces, both inner and outer, of objects of varying sizes and shapes.

Electromagnetic waves, such as radar waves, have been used in the past with waveguides as radiators. However, such waveguides have not been used for scanning points outside of the waveguide.

SUMMARY OF THE INVENTION

It is an object of this invention to provide apparatus and method for scanning the surface of an object adjacent to a fluid by radiation logging means.

It is a further object of this invention to measure only radiation waves that are reflected from the surface of an object, thereby providing a sharper delineation of features than a penetrating-type of radiation velocity measurement.

It is another object to cover more area of the surface of the object per radiation pulse compared to present radiation methods, thus permitting a better coverage of the surface for a given logging speed.

It is still a further object of this invention to provide a radiation logging device and method which minimizes the path of the radiation impulse in the fluid adjacent to the object, thus minimizing the effect of attenuation of the pulses by the fluid.

It is still another object to provide a radiation device that has no moving parts but is adapted to map the entire surface of an object as the device is moved adjacent to the surface being scanned at reasonable logging speeds.

The system of this invention utilizes radiation energy for mapping the surface, inner or outer, of an object adjacent to a fluid. The object may also be any tubular opening having approximately a cylindrical shape such as the inside of a pipe or the hole resulting from drilling in the earth's crust. It may also be an irregularly-shaped object of an extremely large size. It may be an object of extremely small size, such as a sand grain. In a preferred embodiment a radiation scanner is disposed a predetermined distance from the surface of an object adacent to a fluid. The scanner is then actuated to transmit, from the predetermined distance, a pulsed beam of radiation which reflects energy back from any irregularities a substantially constant distance from the scanner encountered by the pulsed beam. Any small irregularities encountered scatters radiation in all directions and that radiation which returns along the reverse path of the outgoing signal is preferentially detected and recorded. This method results in the recording of an electrical signal representing the surface characteristics of a portion of the surface of the object for each pulse of radiation energy from the scanner.

On one preferred embodiment, one or more transmitting-receiving transducers are used to transmit and receive the pulsed beams. The transducers are located in substantially the same horizontal plane in the upper end of a casing or housing. The transducers direct the beams downwardly of the casing. The casing is filled with a fluid other than the fluid adjacent to the object, retained therein by a radiation transparent jacket, of low absorption and of a radiation velocity higher than the fluid adjacent to the object so that the beams from the transducers are deviated out of the casing through slits therein and towards the surface of the object as they emerge from the slits.

The transducers may be switched sequentially so as to map the entire surface of the object. The entire apparatus can be moved adjacent to the object along its entire surface while remaining a fixed distance therefrom so as to observe the same surface spot several times. A superposition of the several observations improves the ratio of the coherent signal to the random disturbances, thus improving the resolution of the surface irregularities.

BRIEF DESCRIPTION OF THE DRAWING

FIGURE 1 is an elevation view of a cross-section of a tubular opening showing apparatus for carrying out applicant's invention disposed therein;

FIGURE 2 is a detailed elevation view of the opening cross-section of FIGURE 1 with the scanner of the apparatus in operating position;

FIGURE 3 is an isometric view of the waveguide of FIGURE 1;

DESCRIPTION OF THE PREFERRED EMBODIMENT

Figure 4:
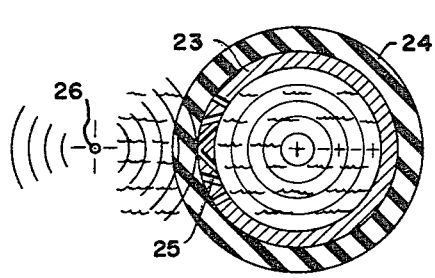
FIGURES 4 and 5 are top plan sectional views of modifications of the waveguide of FIGURE 1.

Throughout this specification, the term "radiation" refers to acoustic or electromagnetic radiation, such as acoustic waves or pulses, radar, etc.

Referring to FIGURE 1, the apparatus of the present invention is similar in structure and operation to that disclosed in Ser. No. 724,182, filed Apr. 25, 1968. An elongated tubular housing 2 is shown which is adapted to be lowered into tubular opening such as a borehole 1 at the end of a cable, preferably a coaxial or multiconductor insulated cable. The cable 4 passes over a suitably powered and calibrated reel 6 which may be coupled or associated with a Selsyn generator 7. The cable 4 is electrically connected to a surface recording unit 8, comprising the desired amplifying, synchronizing and indicating or recording elements. Cable 4 is also provided with sufficient mechanical strength to permit the lowering and raising of housing 2 within borehole 1. Although the invention will be discussed hereinbelow with respect to a borehole, obviously the teachings of this invention may be applied to any tubular opening, or any object having a fluid adjacent thereto, whereby the surface of the opening or object may be mapped using the techniques disclosed herein.

The reel 6, or preferably the output of the Selsyn generator 7, is electrically connected to the unit 8 through a conductor 10 in order that the depth or level of the housing 2 may be measured or recorded at any instant together with the desired indications from the housing 2, as will appear hereinbelow.

The housing 2 consists of a plurality of tubular members, preferably held in fluid-tight, screw-threaded engagement with each other. The housing 2 is provided with centering devices 11 to maintain the housing 2 centered within the borehole 1. The tubular members of housing 2 may comprise an upper head connector 12, through which mechanical and electrical connection is effected between the housing 2 and the cable 4. An inclinometer and azimuth measuring device 13 or comparable means is disposed in housing 2 and coupled to the surface unit 8 through conductors (not shown) within cable 4. The inclinometer and azimuth measuring device 13 is preferably of the type that measures the inclination and the azimuth of the inclination of the housing 2 and supplies related electrical signals. Various types of devices for fulfilling these requirements are known and shown in the prior art. Thus, no description is included in the present application. Also, the azimuthal orientation of the tool in the borehole can be determined by conventional means. One such method is disclosed in a patent to Doll, U.S. Patent No. 2,427,950 and discussed in the aforementioned application of Adair. The particular means necessary for locating the tool with respect to the object being scanned would, of course, depend on the nature of the object being scanned.

A radiation instrumentation section 14 is disposed within housing 2 and contains therein conventional radiation transmitting and receiving apparatus. The radiation instrumentation section 14 includes a radiation scanner 15 containing therein one or more transmitting-receiving radiation devices, such as transducers 16, only one of which is shown in FIGURES 1 and 2. The scanner 15 is shown in detail in FIGURE 2. Transducers having relatively large diameters compared to the wave lengths of the generated waves (such as at least about ½ wave length) are preferred, as for example, piezoelectric crystals. Although the method and apparatus will be discussed hereinbelow with respect to ultrasonic radiation, obviously electromagnets may be used to produce electromagnetic waves. Also, the invention will be described hereinbelow with reference to the scanning of one wall of the borehole 1 adjacent to the perforated wall of the waveguide. Obviously, if the waveguide were rotated in the manner discussed in my copending application, the entire borehole wall could be scanned. In this application of the invention, only a single wall, a portion thereof and/or the inner or outer surface of any object may be readily scanned by one skilled in the art.

In FIGURE 3, the transducers 16 are preferably excited at an ultrasonic frequency and scanner 15 includes a plurality of openings, such as holes or slits 18, to permit radiation to the outside of scanner 15 so that acoustic waves from transducer 16 are glancingly reflected from a strip along the wall when the wall surface is smooth.

Casing 17 of scanner 15 is preferably hollow and formed of a material having longitudinal and transverse acoustic velocities higher than that of water as, for example, steel. The acoustic transducers 16, suitable for generating a specific mode within the casing 17, are located at the top of and within each waveguide casing 17 so as to direct their acoustic rays downwardly along the axis of the casing 17. The rays emerging from casing 17 are all at substantially the same angle to the longitudinal axis of casing 17. The width of the casing 17 is such as to provide a simple normal mode of propagation at the frequency of the acoustic energy radiated by the transducers 16. For any given frequency and wave guide dimensions, several different phase velocities are possible depending upon the pressure distribution within the tube. These different pressure distributions are called modes. The casing is preferably filled with a fluid other than the borehole fluid (or the fluid adjacent to the object being scanned) having a low acoustic absorption and an acoustic velocity higher than that of the borehole fluid in order to cause the energy to be radiated into the borehole fluid and the rays to deviate towards the borehole wall as they emerge from slits 18. An acoustically transparent jacket 20, as for example, rubber having an acoustic velocity intermediate between the fluid within slits 18 and the borehole fluid, surrounds casing 17 in order to retain the fluid within the casing 17. The energy stays in the casing because the frequency and geometry correspond to a mode which propagates without attenuation. The steel walls of casing 17 acts as an interface between the fluid within slits 18 and the borehole fluid. As the rays 19 emerge from the slits 18 as can be seen in FIGURE 3, because of the selection of materials having the acoustic velocities as discussed above, the result is as if the fluid within slits 18 and the borehole fluid were directly adjacent to each other. The jacket 20 and casing 17 thus act as an interface between the fluids.

The acoustic instrumentation section 14 of the housing 2 contains instrumentation 21 for selectively actuating in sequence the transducers 16. For example, any conventional type of stepping switch arrangement coupled by electrical connection means (not shown) to recording unit 8 is contemplated; the transducers 16 could also be actuated manually, if desired. The preferred selective actuation instrumentation may be conventional transistor switches which are well known in the art.

The operation of the transducers 16 to map and record the entire wall of a borehole are explained in detail in my copending application. Accordingly, further discussion is deemed unnecessary.

FIGURE 3 shows the casing 17 having a plurality of slits 18 disposed along one wall thereof. A plurality of transducers 16, each transducer aligned with one of the vertical row of slits 18, is shown disposed at the top of the waveguide casing 17. Obviously, a plurality of rows of slits 18 with a like number of transducers 16 may be disposed in each waveguide casing 17. Further, the invention disclosed herein is not to be limited to a single waveguide.

As shown in FIGURE 3, the object being scanned may comprise a rock or sand particle 22 (exaggerated in size), thereby requiring slits 18 on only one wall of the waveguide casing 17. The arrows indicate the direction of travel of the waves inside and outside of the waveguide.

Thus, in the foregoing, acoustic waves may be propagated down a waveguide tube having rigid or pressure release walls and, under certain conditions of frequency, tube dimensions and elastic properties, losses are kept very low. A summary and bibliography of such use is provided in Mechanical Wave Guides, by Martin Redwood, Pergamon Press, 1960, Chapters 3 and 4. The discussions in the Redwood book are also applicable to electromagnetic waveguides with elastic properties become dielectric properties and rigid walls becoming conducting walls.

If such a waveguide tube (which may be any cross-section, such as the rectangular tube of FIGURES 2 and 3) is perforated with openings, such as holes or slits, these openings permit small amounts of coupling with the outside medium. Thus, the waveguide becomes leaky or radiating. A short pulse of acoustic radiation sent down such a leaky waveguide excites successive portions of the waveguides causing the radiation of a beam of acoustic energy into the outside medium in a direction relative to the axis of the waveguide that is determined by the ratio of the phase velocity inside the waveguide to the acoustic velocity in the outside medium such as illustrated in FIGURE 3.

Figure 5:
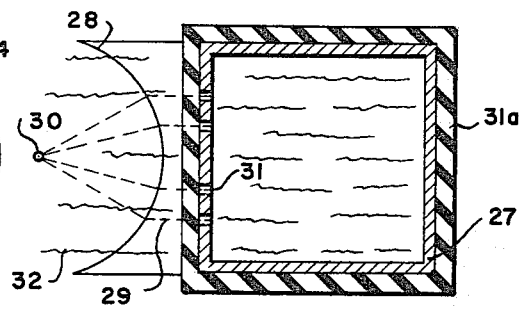

The direction of radiation in a plane perpendicular to the waveguide is controlled by the size, shape and disposition of the openings on the surface of the waveguide (FIGURES 2 and 3) or by the use of a cylindrical acoustic lens as illustrated in FIGURES 4 and 5.

FIGURE 4 shows a cross-section of a circular waveguide 23 similar to that of FIGURES 2 and 3. Waveguide 23 is enclosed by an outer cover 24 similar to the acoustically transparent cover 16. A plurality of openings, such as slots or ports 25 extend longitudinally of waveguide 23. Ports 25 are so disposed (i.e., have an angular relaitonship to each other) that radiated beams (i.e., the resultant wave fronts) exiting therefrom come to focus outside of the waveguide 23 as illustrated by the focal point 26 in FIGURE 4. This is the principle behind a lumped parameter acoustic lens. The plus and minus symbols in waveguide 23 indicate the pressure distribution within the waveguide 23. A wave front is a surface of constant pressure phase (i.e., the continuous surface over which the pressure is positive is a wave front). The function of the acoustic lens is to advance or retard the phase of the wave front as it passes through the lens, thus forming a new wave front surface of another shape to, for instance, bring the wave to a focus at a point. Thus, the waveguide 23 of FIGURE 4 may be used in place of the waveguides of FIGURES 2 and 3. This type of radiating waveguide which sends out a beam of acoustic energy only in a particular direction is sensitive to a beam traveling in the reverse direction. Therefore, the energy that is back-scattered from an object reenters the waveguide 23 and travels back to the energy source (such as a transducer disposed at the top of waveguide 23) where the same transducer used to generate the original pulse is used to detect the returning pulse.

Since back-scattering is a result of irregularities as discussed in detail in both my copending application and the copending application to Adair, the waveguide 23 is particularly sensitive to irregularities such as fractures, flaws, cavities, rough surface due to the nature of the material being scanned, vugs or pits, etc. A perfectly smooth, regular surface which gives only specular reflection is represented as an absence of back-scattered energy. The back-scattered energy from a rough or irregular surface is related to the irregularities or grain size and to the wave length of the signal used to iradiate it. Thus, several different frequencies either from different waveguides or by exciting different modes in the same waveguide may be used to detect irregularities of different dimension.

Alternatively to the waveguide 23 of FIGURE 4, the square-shaped waveguide 27 of FIGURE 5 may be used in connection with a cylindrical lens 28 to focus rays 29 at the focal point 30 of lens 28. A plurality of slots or ports 31 extend longitudinally of waveguide 27. An acoustic jacket 31a encloses waveguide 27. The lens is of a material having a higher acoustic velocity than the outside fluid medium 32.

Figure 6:
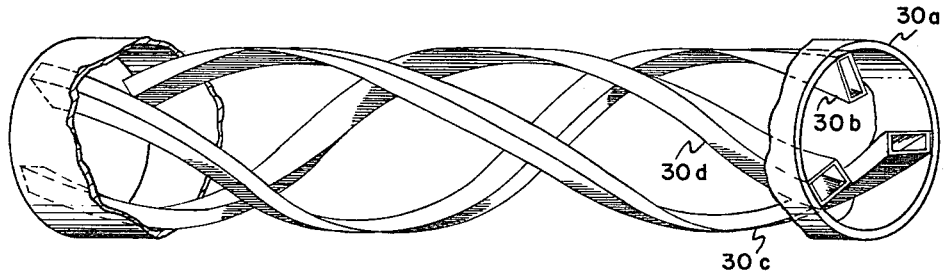

In a preferred embodiment of the invention, three waveguides are employed, each using a different wave length, as illustrated in FIGURE 6. As waveguide 30a is drawn up the borehole 1, each waveguide 30b, c and d, respectively, scans every part of the borehole. These three images are then superimposed in the display device.

Alternatively, the same waveguide may be excited successively in three different modes. In both cases, the picture of the surface being scanned resulting from irradiation by each of these three frequencies may be superimposed using three primary colors. The resulting color picture is then interpreted in terms of surface roughness or grain size. The three colors may be recorded in a direct recording scheme, but a more practical approach is to use a cathode ray tube (not shown) with color capability, such as a color TV tube, and photograph with color film.

Figure 7:
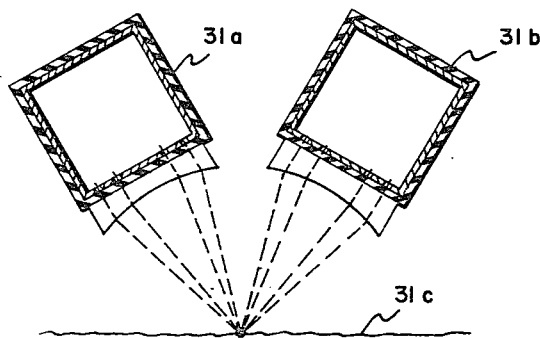

As illustrated in FIGURE 7, a two-waveguide arrangement may be used where waveguide 31a is used as a radiating waveguide and waveguide 31b is used as a receiving waveguide. Thus, energy scattered from reflecting surface 31c is received at waveguide 31b as indicated by the lines of radiation in FIGURE 7. In this manner, two waveguides may be used to scan an irregular surface.

Figure 8:
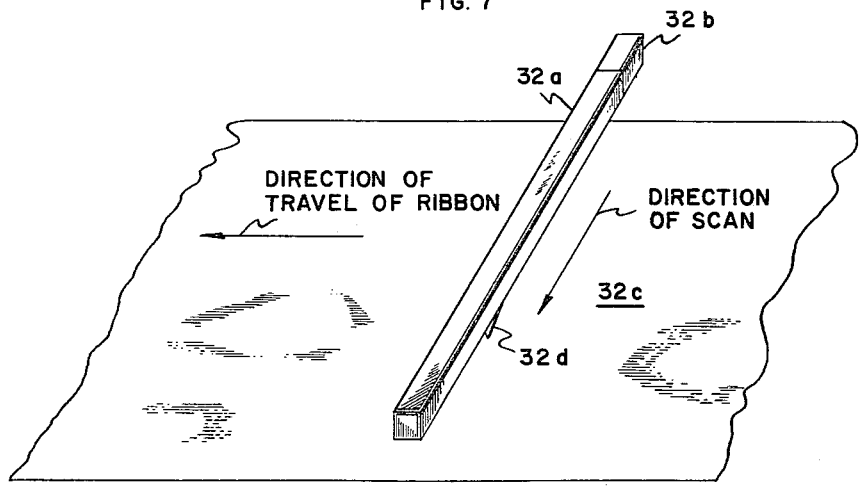

A scanning waveguide in accordance with the teachings of this invention may be partially immersed vertically in a fluid and used to monitor the level of the fluid, as for example fluid in gauging tanks, or measuring wave heights or detecting oil-water contact. Obviously, the waveguides of this invention may be used to inspect the inside of pipes for surface roughness, pits or flaws. In one application of this invention, a waveguide 32a may be arranged across a ribbon of paper or metal as it emerges from a rolling mill so as to detect flaws or holes, as illustrated in FIGURE 8. Thus, waveguide 32a has a transducer 32b disposed at one end for generating and receiving pulses. A ribbon 32c is shown formed of material which is to be inspected for changes in surface properties. The arrows indicate the direction of scan and travel of ribbon 32c. Waveguide 32a is slotted on its underside (not shown) so that a scanning beam 32d is emitted. Any changes in signal from beam 32d are back-scattered to transducer 32b, thereby indicating changes in the surface properties of ribbon 32c.

Figure 9:
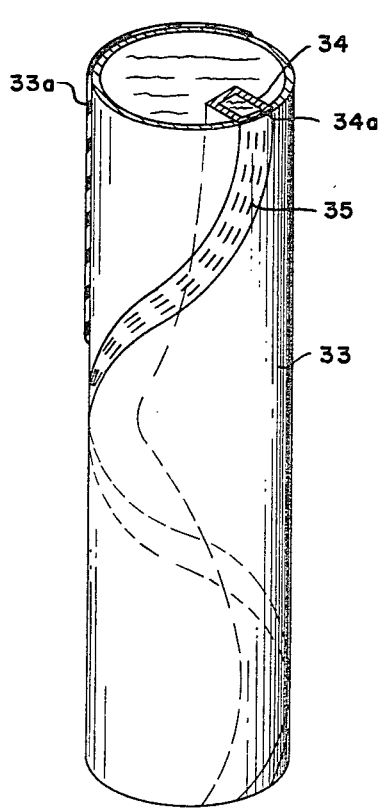
FIGURES 6 through 10 are isometric views of further modifications of the waveguide of FIGURE 1.

In a further embodiment of the invention illustrated in FIGURE 9, a waveguide casing 33 is shown similar to the waveguide disclosed in my copending application. Thus, waveguide casing 33 is preferably a solid cylinder enclosed by a thin jacket 33a of acoustically transparent material to keep the medium fluid, such as a borehole fluid, from entering waveguide 34. The waveguide 34 is a fluid-filled one-turn helical waveguide having a preferably generally rectangular shape which extends longitudinally and helically of casing 33. A thin wall 34a is formed between waveguide 34 and jacket 33a comprised of the same material as casing 33. A plurality of slits 35 in wall 34a permit radiation to the outside medium (not shown) and extend longitudinally of waveguide 34. The use of the waveguide 34 is similar to that described in detail hereinabove and in my copending application; accordingly, further discussion of the use of waveguide 34 is deemed unnecessary.

Thus, the waveguide 34 of FIGURE 9 is made in such a way as to generate a radiation beam which scans a helical path on the surface being scanned making one complete revolution of the surface each time the transducer is pulsed. In other words, if a cylindrical opening such as a borehole is being scanned, the waveguide 34 scans a helical path on the cylindrical surface of the opening.

Alternatively to the waveguide 34 of FIGURE 9, the waveguide may comprise a circular cylindrical waveguide 36 having an acoustic jacket 36a enclosing a plurality of ports or slits 37 on the surface of waveguide 36 which slits 37 are arranged in a helical fashion to permit scanning a helical path on the surface being scanned, such as the cylindrical surface of a borehole wall. In both cases, the waveguides of FIGURES 9 and 10 (and thus their slots or ports) are filled with a fluid other than the fluid adjacent to the object being scanned (as, for example, a borehole fluid), the fluid being retained therein by the acoustically transparent jackets 33a and 36a of low absorption similar to jacket 16, 24 and 31a of FIGURES 2, 4 and 5. Both embodiments can obtain information from all directions within the vicinity of the object being scanned, as for example within a tubular opening, using only a single waveguide and transducer.

Figure 10:
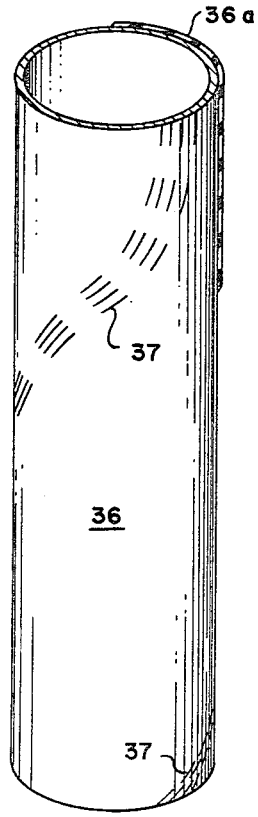

In a practical application of this invention utilizing the embodiments of FIGURES 9 and 10, assuming a tubular opening is being scanned, it can be seen that if the tubular opening itself can be "unrolled," we would have a flat "ribbon." A single scan of the helical scanning waveguides of FIGURES 9 and 10 would correspond to a diagonal line across the ribbon extending over an interval as long as the waveguide length (that is, the length of waveguides 33 and 36).

Figure 11:
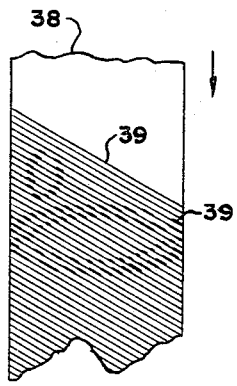
FIGURE 11 is a graphical recording of the information derived from the waveguides of FIGURES 9 and 10.

Thus, as illustrated in FIGURE 11, if we diagonally scan a ribbon 38 of film or other recording medium with a moving stylus, such as the image of the spot of light on a cathode ray tube, then modulate the stylus with the information derived from the back-scattered signal while the ribbon 38 is moved proportional to the movement of the waveguide in the tubular opening as indicated by the arrow in FIGURE 11, a film strip picturing the "unrolled" inside of the tubular opening is obtained. FIGURE 11 shows a plurality of diagonal lines 39 presenting a picture of the inside of the tubular opening generated by many scans similar to a television picture. Each darkened area 39 corresponds to one scan of a light beam which corresponds to one pulse along a waveguide. Successive scans correspond to successive pulses. The film motion (i.e., in the direction of the arrow) corresponds to motion of the waveguide in the tubular opening being scanned.

Example

In one specific application of the waveguides of FIGURES 9 and 10 to the scanning of the interior of a borehole having borehole fluid therein, a waveguide five feet long is provided requiring .002 second for a pulse to travel the length of the waveguide and return, the waveguide being filled with water. The transducer of the waveguide is pulsed every .010 second (i.e., 100 times per second), such time (.010 second) being sufficient for the energy pulse to decay within the waveguide. The waveguide is advanced within the borehole at the rate of two feet per second. This rate of advancement samples the wall of the borehole every .020 foot along its length. A pulse train of 10.0 mHz. waves, one microsecond or ten wave length in length, has a wave length of .0005 foot and the train will be .005 foot long. Since it is possible to resolve objects separated by only a few train lengths, we have a resolution of the order of 0.01 foot; since we obtain maximum back-scattering from objects having dimensions comparable to the wave lengths used, the waveguides are sensitive to scattering from objects of sand grain size.

Again by using three different waveguides or the same waveguide at three different frequencies different by factors of two to ten, the range of grain size to which the waveguides are sensitive may be changed and, by displaying the results using three colors as disclosed hereinabove, a color picture where color is related to grain size may be obtained.

The pulses of the transducers and the manner of using the waveguides and recording the reflected energy is discussed in detail in my copending application which is incorporated herein by reference.

I claim as my invention:

1. A method for scanning the surface of an object adjacent to a surrounding medium by transmitting a pulsed beam of energy through said medium and into engagement with said surface, said method comprising the steps of:
   transmitting a pulsed beam of radiation from a predetermined position with respect to said object;
   guiding said pulsed beam through a radiation waveguide wherein the phase velocity of the pulsed beam through the waveguide is greater than in said medium;
   directing said pulsed beam at a known angle from said waveguide through said medium and into engagement with said surface;
   detecting at substantially said predetermined position and substantially at said known angle radiation reflected from the surface of said object through said radiation waveguide; and detecting and recording the radiation reflected from any irregularities a substantially constant distance from said waveguide appearing along the surface.

2. The method of claim 1 including the steps of:

transmitting pulsed beams from a plurality of closed spaced predetermined positions at substantially the same known angle from said waveguide to said object;

obtaining a visual indication of surface irregularities from which no radiation is reflected at each closed spaced predetermined position; and detecting and recording the radiation reflected from any irregularities appearing along the adjacent surface during each closely spaced predetermined position, thereby obtaining a close stacked series of signals, each representing a surface strip of the surface of the adjacent object.

3. The method of claim 1 wherein the step of directing said pulsed beam at a known angle from said waveguide includes directing said beam at such an angle that said beam focuses outside of the waveguide at a focal point.

4. The method of claim 1 wherein the step of directing said pulsed beam at a known angle from said waveguide includes directing said beam in a helical path on the surface of said object being scanned.

5. Apparatus for scanning the surface of an object adjacent to a surrounding medium which comprises:

a housing;

a radiation waveguide associated with said housing;

supporting means operatively engaging said housing for supporting said housing in said medium adjacent to said object;

a plurality of openings being formed within said waveguide and extending longitudinally thereof;

transducer means cooperating with said waveguide adapted to produce a pulsed beam of relatively high frequency radiation waves, transmit a narrow beam of said waves from said waveguide through the medium adjacent to the object and receive the reflection of said waves;

said transducer means being adapted to direct the pulsed beam outwardly of the waveguide through the openings at a known angle to said transducer means; and said waveguide being adapted to contain a fluid of low radiation absorption and of a radiation velocity higher than that of the medium adjacent to the object so as to cause the pulsed beam to be radiated from the waveguide through the openings therein and towards the object as it emerges from the openings.

6. The apparatus of claim 5 including a plurality of rows of said openings extending longitudinally of said waveguide;

transducer means associated with each of said rows; and selective transducer operating means operatively engaging all of said transducer means for selectively operating each of said transducer means.

7. The apparatus of claim 5 including acoustically transparent jacket means surrounding said waveguide for containing the low acoustic absorption fluid within said waveguide.

8. The apparatus of claim 5 wherein said waveguide is a cylinder and said openings are slots equally spaced longitudinally of said waveguide.

9. The apparatus of claim 5 wherein said transducer means are acoustic transducers located in the upper portion of said waveguide and aligned with said waveguide so as to direct the pulsed beams downwardly of said waveguide.

10. The apparatus of claim 5 including radiation instrumentation means located within said housing and operatively engaging said transducer means for converting electrical energy into radiation and for converting radiation into electrical energy received from said instrumentation means.

11. The apparatus of claim 5 wherein said waveguide is a cylinder and said openings are slots so shaped as to cause said pulsed beam to focus at a focal point outside of said waveguide.

12. The apparatus of claim 5 including:

cylindrical radiation lens means disposed adjacent to said waveguide and having a radiation velocity higher than the radiation velocity of the fluid adjacent to said object being scanned; and said waveguide is rectangular and said openings are slots extending longitudinally of said waveguide and so shaped as to cause said pulsed beam to focus at the focal point of said lens means.

13. The apparatus of claim 5 wherein said waveguide is helically-shaped and said openings are slits extending longitudinally of said helically-shaped waveguide.

14. The apparatus of claim 5 wherein said waveguide is cylindrically-shaped and said openings are slits extending in a helical path longitudinally of said waveguide.

References Cited

UNITED STATES PATENTS 2,408,435   10/1946   Mason _____ 340—6

RODNEY D. BENNETT, Jr., Primary Examiner

C. E. WANDS, Assistant Examiner